United States Patent [19]

Longfield

[11] Patent Number: 5,724,523

[45] Date of Patent: *Mar. 3, 1998

[54] ELECTRONIC INCOME TAX REFUND SYSTEM UTILIZING THE TAX REFUND TO UNDERWRITE ISSUANCE OF A SECURED CREDIT CARD

[75] Inventor: Ross N. Longfield, Far Hills, N.J.

[*] Notice: The term of this patent shall not extend beyond the expiration date of Pat. No. 4,890,228.

[73] Assignee: Beneficial Franchise Company, Inc., Wilmington, Del.

[21] Appl. No.: 491,615

[22] Filed: Jun. 19, 1995

Related U.S. Application Data

[63] Continuation of Ser. No. 18,941, Feb. 17, 1993, abandoned, which is a continuation-in-part of Ser. No. 270, Jan. 4, 1993, abandoned, which is a continuation of Ser. No. 615,903, Nov. 20, 1990, Pat. No. 5,193,057, which is a continuation of Ser. No. 384,654, Jul. 25, 1989, abandoned, which is a continuation of Ser. No. 146,324, Feb. 21, 1988, Pat. No. 4,890,228.

[51] Int. Cl.$^6$ .................................................. G06F 17/60
[52] U.S. Cl. ........................... 395/235; 395/231; 395/239
[58] Field of Search ................................. 395/401, 230, 395/231, 235, 238, 239, 242

[56] References Cited

U.S. PATENT DOCUMENTS

| | | |
|---|---|---|
| 4,321,672 | 3/1982 | Braun et al. . |
| 4,376,978 | 3/1983 | Musmanno et al. . |
| 4,597,046 | 6/1986 | Musmanno et al. . |
| 4,648,037 | 3/1987 | Valentino . |
| 4,694,397 | 9/1987 | Grant et al. . |
| 4,736,294 | 4/1988 | Gill et al. . |
| 4,890,228 | 12/1989 | Longfield .................. 364/408 |
| 5,193,057 | 3/1993 | Longfield .................. 364/408 |

OTHER PUBLICATIONS

Specifications For Electronic Filing of Individual Income Tax Returns (Tax Year 1986); dated Oct. 15, 1986 author Internal Revenue Service–Research Division.
Specifications For Direct Deposit of Individual Income Tax Refunds (Tax Year 1986); dated Oct. 15, 1986 author Internal Revenue Service–Research Division.

(List continued on next page.)

*Primary Examiner*—Gail O. Hayes
*Assistant Examiner*—Steven R. Yount
*Attorney, Agent, or Firm*—Connolly & Hutz

[57] ABSTRACT

Electronic data processing system for preparation of electronically filed tax returns and authorization and payments of refunds based on the data supplied in those returns. Electronic data processing programs are provided for creating an electronic tax return that is filed with a tax collecting authority. At the same time as the electronic tax return is created a loan application is processed to create an electronic deposit/loan account for the tax filer at an authorized credit institution. The tax filer can receive a loan or use the tax refund as collateral for a secured credit card. As early as the day after completion of the tax return and loan application, the tax filer receives initial refund payment from the loan account. The authorized credit institution electronically files the electronic tax return with the tax collecting authority which processes the return and transfers by electronic fund transfer the refund amount to the deposit/loan account at the authorized credit institution. Any refund in excess of the initial refund payment is then forwarded to the tax filer. Provision is also made for checking the credit worthiness of the tax filer.

15 Claims, 2 Drawing Sheets

OTHER PUBLICATIONS

Request To Reopen And Modify Consent Order; Docket No. D–8922 dated May 27, 1986; by Beneficial Management Corporation.

H&R Block Rapid Refund Advertisement—alleged to have been distributed prior to Jan. 20, 1987 by H&R Block.

"IRA Watch: Telephone Center Is Chase's IRA Entry", American Banker, Apr. 12, 1984, p. 221 (Abstract).

"Bankers and the Fear of Flying", Fisher John, Economic Review, v. 76n7, pp. 48–62, Jul. 1982 (Abstract AN: 82–18915, Inform of Orbit).

"Chemical Switches on Pronto, New Home–Banking System", Ad Forum, v. 4n9, p. 63 Sep. 1983 1 p. AN: 83–26924 Inform of Orbit.

"New Technology Lets Your Fingers Do the Banking", Washington Post, Dec. 18, 1988.

"Bank's Secured Credit Card Works Better than Most", Anonymous, ABA Banking Jrnl, V83N1, pp. 73, Jan. 1991 Abstract from Inform file of Orbit AN: 91–05563.

ELECTRONIC INCOME TAX REFUND SYSTEM UTILIZING THE TAX REFUND TO UNDERWRITE ISSUANCE OF A SECURED CREDIT CARD

This is a continuation of Ser. No. 08/018,941, filed Feb. 17, 1993 and is now abandoned, which is a continuation-in-part of Ser. No. 08/000,270, filed Jan. 4, 1993 and is now abandoned, which a continuation of Ser. No. 07/615,903, filed Nov. 20, 1990 and has issued as U.S. Pat. No. 5,193,057, which is a continuation of Ser. No. 07/384,654, filed Jul. 25, 1989, and is now abandoned, which is a continuation of Ser. No. 07/146,324 filed Jan. 21, 1988 which is now U.S. Pat. No. 4,890,228.

This application has three appendices that contain microfiche. Microfiche Appendix I contains one page with 21 frames. Microfiche Appendix II contains one page with 8 frames. Microfiche Appendix III contains one page with 8 frames.

BACKGROUND OF INVENTION

This invention relates to a data processing system for use on programmable data processing machines. More particularly, the invention comprises a data processing program for the preparation of tax returns, for electronic filing thereof with a taxing authority and data processing programs for creating a deposit/loan account at an authorized financial institution for providing immediate payment of tax refunds based on such prepared and filed returns. The deposit/loan account is created with the capability of receiving electronic fund transfer deposits directly from the taxing authority. Once the funds are received in the deposit/loan account they may be transferred into a Certificate of Deposit (CD) which can be used as collateral for a secured credit card issued to the tax filer. The credit limit of the card would typically be based on the value of the CD.

In recent years, taxing authorities have increasingly automated the tax collecting and tax return filing process. In particular, the United States Internal Revenue Service (IRS) has instituted a system for the electronic filing of tax return data. In conjunction with that system, the IRS has arranged to pay refunds by electronic funds transfer using the United States' Treasury automated clearing house (ACH) origination system. While this has greatly improved the tax filing and refund process it still requires a period of three to six weeks from the filing of an individual's tax return to the time of receipt of a refund check. In contrast, the system of the invention shortens the time from filing to receipt of a refund to as little as one day.

In addition, this invention provides a system whereby tax filers who have no credit or poor credit may receive credit cards. It's nearly impossible these days to get by without a credit card especially if one wants to rent a car or stay at a hotel. But it is equally impossible to get a credit card if a tax filer has experienced credit problems or never had the chance to establish good credit. The instant invention allows these tax filers to receive a secured credit card and to establish good credit. Additionally, advantages and features of the instant invention will become more readily apparent from the following detailed description of a specific illustrative embodiment thereof presented hereinbelow in conjunction with the accompanying drawing and appendices.

BRIEF SUMMARY OF INVENTION

The present invention is a unique combination of data processing programs resulting in a data processing system that provides a tax refund payment within 24-48 hours from the time of filing a tax return. In the present embodiment an Electronic Filing Program prepares a 1040, 1040A or 1040EZ federal tax return acceptable for electronic transmission to the United States Internal Revenue Service, on the basis of tax filer provided data. At the same time, the tax filer applies for a refund loan and, on the basis of filer provided credit data, a deposit/loan account is opened at an authorized financial institution. In a preferred use of the system of the invention, the entire transaction takes place at the offices of an authorized tax return preparer. Such a use of the system provides the tax filer with the benefit of having a tax return prepared and filed on one day and picking up a check at the same office for any refund due, less tax preparation fees and filing fees, on the next day; all without any out of pocket payment by the tax filer. In addition, the tax filer can apply for a secured credit card by designating some or all of his or her tax refund as collateral for a secured credit card. Absent an acceptable credit history, credit card companies such as MASTERCARD or VISA typically require that the person applying for a credit card post collateral in order to receive a card. The system of this invention would enable a tax filer with no credit or poor credit to obtain a credit card using the tax refund as the needed collateral.

The specific embodiment of the data processing system of the invention is disclosed in the form of program flow charts enabling a skilled programmer to write programs in any of a variety of computer programming languages (e.g., COBOL) which can be executed on any of a number of data processing machines. It is also anticipated that programs equivalent to the disclosed programs can be written by those skilled in the art to achieve the unique benefits of the data processing system of the invention.

Microfiche Appendix I—is a program flow diagram for the Electronic Filing Program of the disclosed embodiment of the invention.

Microfiche Appendix II—is a program flow diagram of the deposit/loan program of the disclosed embodiment of the invention.

Microfiche Appendix III—is a program flow diagram of the secured credit card program of the disclosed embodiment of the invention.

DETAILED DESCRIPTION OF THE INVENTION

Figure 1:
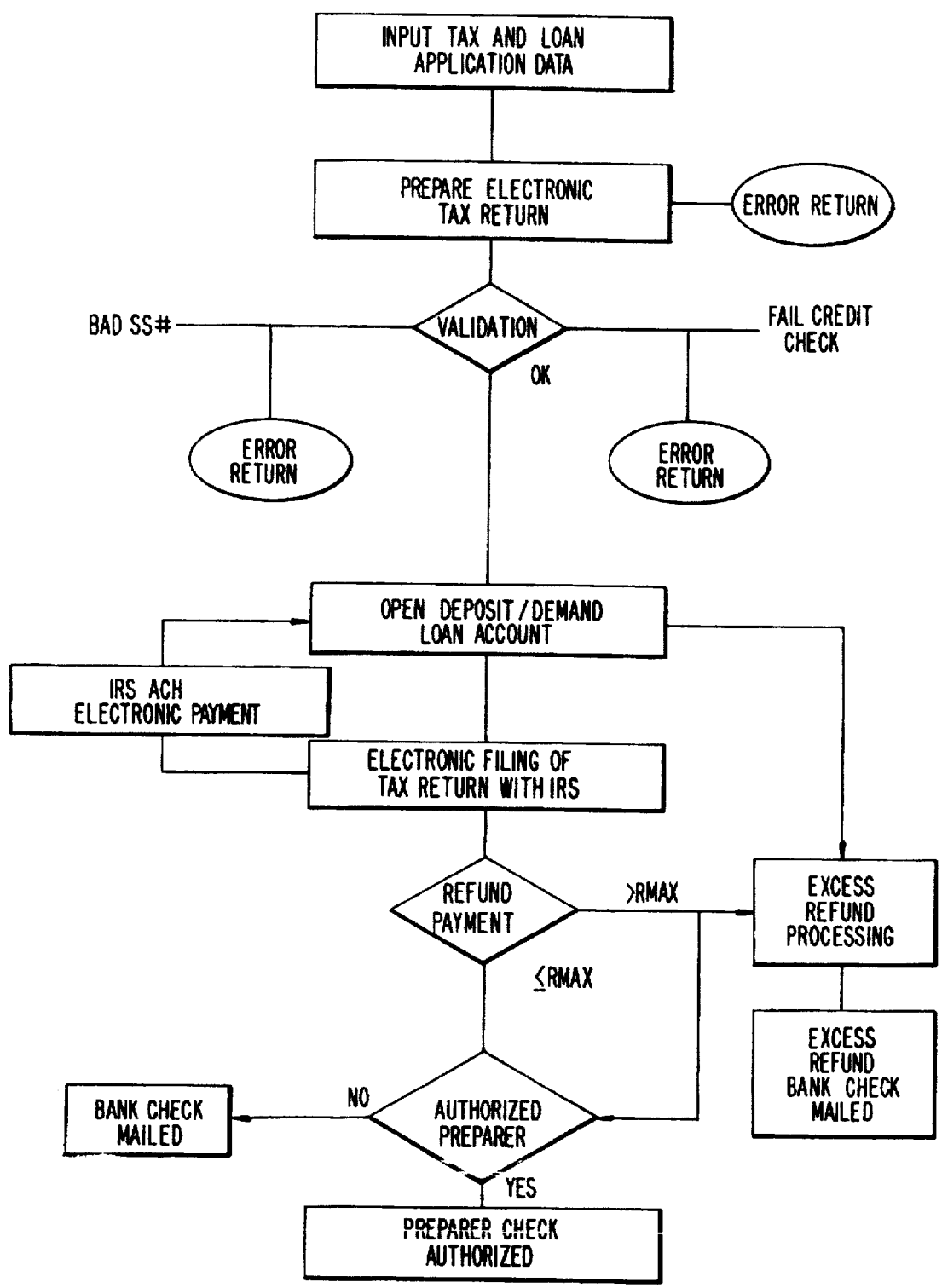
FIG. 1—is a schematic flow diagram of data processing functions of the invention.

Referring now to FIG. 1, there is shown in schematic flow diagram form an overall depiction of the data processing functions for implementing one embodiment of the invention. Input means 10 is used for imputing tax preparer, taxpayer identification, taxpayer tax return information and refund anticipation loan information. In a preferred embodiment input means 10 comprises an intelligent terminal such as a personal computer having programmable data processing arithmetic and logical functions, a keyboard, a visual monitor, data storage and data transmission capabilities. Data input using such an input means is hereinafter described in more detail.

Once data input is complete, a program is executed by a data processing means to create electronic tax return files 20 which are in a form accepted by the taxing authority processing the taxpayer tax return. In the present embodiment, a program flow chart of an Electronic Filing Program for preparing 1040, 1040A and 1040EZ tax returns in electronic format acceptable to the United States Internal Revenue Service comprises Microfiche Appendix I hereto. It is also necessary to validate tax return data and loan application data as is shown in block 30. Validation of tax return data including mathematical checking is performed by the Electronic Filing Program of Microfiche Appendix I. In addition, individual identification data is compared to a file containing credit information to identify individuals with unacceptable credit histories.

When validation is complete, a deposit/loan account 40 is created at a authorized financial institution, e.g., bank, financial union, Savings and Loan Association, etc., that issues advance payments of taxpayer refunds. To accomplish this in the present embodiment the authorized financial institution programs a data processor means in accordance with the program flow chart of Microfiche Appendix II which is more fully described hereinafter.

After creation of the deposit/loan account file 40, the tax return data is electronically filed with the taxing authority as indicated in block 50. In the present embodiment, the taxing authority is the IRS and the tax preparer and return data is supplied via electronic transmission to designated IRS computers. This data also includes identification of the deposit/loan account which is designated to receive electronic fund transfer refunds directly from the IRS through the Treasury Department's ACH system.

As soon as the validated tax return data and loan application data have been processed and a refund amount is determined, the refund loan payment procedure 60 is initiated. The payor authorized financial institution may have set a maximum amount (Rmax), for example $2,500, which it will immediately pay out as a refund loan. Therefore a determination is made as to whether or not the claimed refund exceeds this amount. If that is the case, excess refund processing is entered and an excess refund payment 80 is generated when the electronic funds payment is received. Simultaneously, the maximum authorized amount of refund anticipation loan is processed by determining whether or not payment is to be made through an authorized preparer 90 or directly by the authorized financial institution 100. In the case of an authorized preparer a financial institution check is issued by the preparer for delivery the next day. In the case of direct payment by the authorized financial institution, a check is mailed to the tax filer the next day. The foregoing constitutes an overall description of the data processing system of the invention.

Returning now to the Electronic Filing Program 20 of the present embodiment which is set forth in the program flow charts of Microfiche Appendix I. The Electronic Filing Program (EFP) is designed to be used by tax preparers having an intelligent terminal input means 10. The program enables preparers 20 to electronically enter tax returns and transmit them to a remote processing center. The remote processing center gathers tax returns from many tax preparers and collectively transmits them to the IRS. The System Specifications of the EFP are divided into four main sections. These sections describe the tax preparers duties and systems operations as they pertain to 1. SYSTEM INITIALIZATION, 2. DATA ENTRY, 3. TRANSMIT, and 4. FOLLOW-UP.

The system initialization process is designed to make it as easy as possible for the tax preparer. It sets up all the files required by the EFP software, and guides him through the terminal screen provided for the entry of the tax preparer information (Microfiche Appendix I). The system is designed for the entry of the tax preparer information separately so that it needs only to be entered once, but provides the tax preparer the opportunity to change this information if needed. In the present embodiment, such tax preparer data is in the form required by the IRS for preparers eligible to file tax return data electronically.

The tax preparer gathers all the necessary information from a client to file a tax return. The EFP can handle the three basic tax returns, 1040, 1040A and 1040EZ and certain supported schedules and forms. The tax preparer then goes to his intelligent terminal and enables the EFP program.

After the preparer has completed the 1040, 1040A or 1040EZ form by following the input procedures, the EFP software performs two major functions. First, it determines the presence of errors in the entry of most of the major fields. Second, it determines from the information entered on the 1040 if any of the supported forms or schedules are required. If any of the supported forms or schedules are required it automatically brings to the screen the required data entry format for completion by the preparer.

After the preparer has entered all of the information for the 1040, 1040A or 1040EZ, and all related forms and schedules, the software automatically displays a summary screen.

The preparer then enters his code on the summary screen and the system automatically displays all of the information from the preparer file. The information on the preparer file is entered only once and can be updated as needed by using option seven from the main menu. It is attached to each tax return through the summary screen. The summary screen also provides for the input of authorized financial institution route information and displays a list of the required documents.

When the summary screen is completed the system displays the screen for the entry of W-2 information.

When all of the required W-2's have been completed the software automatically returns to the main screen. At this time the preparer can either enter another 1040, 1040A or 1040EZ or select which returns are to be transmitted to the remote processing center.

After all required tax returns have been entered the preparer can transmit the returns to the remote processing center. This is accomplished by selecting the 'NEW TRANSMISSION FILE' entry from the main screen. When this item is selected the transmit screen is displayed, the preparer indicates the returns to be transmitted by changing the status code on the transmit screen to 'T'. The system then adds these tax returns to the transmit file, dials the remote processor center number, and transmits the data over either dedicated or ordinary telecommunication lines.

The week after a tax return has been accepted by the IRS, the preparer must ship a form 8453 and supporting documents such as W-2's to the IRS. IRS rejected returns are corrected by the central processing center unless the tax meaning of the return would be altered, in which case the preparer is informed and asked to re-process the return.

In the present embodiment the validation 30, account file creation 40, electronic filing 50, and refund payment process 60, 70, 80, 90 and 100 are all performed at the remote processing center. These functions are performed by data processing programs created in accordance with appendix II hereto. In overview this embodiment of the system of the invention permits a tax filer to obtain a refund loan within one or two days of filing his tax return through an authorized preparer directly or by mail from the participating authorized financial institution. This is in contrast to the typical 6 to 8 weeks required to receive a refund directly from the IRS.

Rapid refund payment is accomplished by the authorized financial institution issuing to the tax filer a demand loan for an amount of the tax filer's calculated IRS refund. This loan is in the form of a check issued by the authorized financial institution and has the loan terms on the check document. A deposit account is opened for the customer at the authorized financial institution to which the tax filer's IRS tax refund is sent via the IRS electronic funds transfer ACH system. This IRS refund payment, when received is automatically applied as payment of the tax filer's loan, paying it off, assuming that none of the refund was withheld by the IRS. In the event that a cap has been set by the lender, any refund in excess of the amount of the loan is subsequently issued in an additional check for that excess amount and mailed to the tax filer.

To accomplish this in the Refund Anticipated Loan (RAL) system of the embodiment of Microfiche Appendix II, an issue file will be transmitted from the remote processing center. Multiple ties are allowed on a daily basis. This file will be posted to a masterfile on the authorized financial institution data processing means, in this instance a NCR 8250. Validation will be performed on the file received from the remote processing center. Fields validated include the Social Security Number field for numerics and non duplicate Social Security Number, the amount file for numerics and the Name and Address filed for Alpha/Numerics. The individual items and amounts are summed up and compared against the trailer record for control. The loan application is also compared to a master credit data file to validate the credit worthiness of the applicant tax filer. A failure of this test will result in an error return to the originating tax preparer the next day. The RAL refund checks are generated from the file transmission and update. The checks are mailed within 24 hours from receipt of file from the authorized financial institution or in the case of authorized preparers will be issued the next day by the preparer. Four reports are generated by this program. They are the Input Validation, Update Report, RAL Checks, and Check Register.

Each day three reconciliations are performed against the RAL Masterfile. One is for the clearing of the cashed RAL checks. The information from all captured bank checks is searched and RAL refund check information extracted. This is posted against the RAL Masterfile. The checks are matched by serial number to the RAL Masterfiles Serial Number to insure that the amount cleared equals the amount issued. All exceptions are noted as an exception for manual exception item handling. All validated checks are posted against the RAL Masterfile, and the date cleared is stored.

A second reconciliation is performed daily. This is a reconciliation against all incoming IRS ACH items. The IRS ACH Incoming file is searched for RAL IRS Tax Refunds. This is keyed off of the account number file din the IRS ACH record. A unique constant eight digit number followed by the tax filer's Social Security number is use din the Account Number filed for the IRS ACH Refund. Based upon this unique number, the IRS ACH items are searched and information pulled for validation and update to the RAL Masterfiles. Four reports are generated. They are the IRS ACH RAL Validation Report, the Update Report, Excess Refund Checks, and Excess Refund Check Register. These Excess Refund Check Issues are posted to another reconciliation masterfile.

A third reconciliation is made for the Excess Refund Checks. This is a basic reconciliation system. Each day all data from the captured checks is searched and Excess Refund check information is extracted to post against the Excess Refund reconciliation Masterfile. Again two reports are generated, one is a Validation Report and the second an Update Report.

On a periodic basis, a program is run to strip off from the RAL Masterfile and Excess RAL Refund Masterfile, all completely cleared items to a history file.

Figure 2:
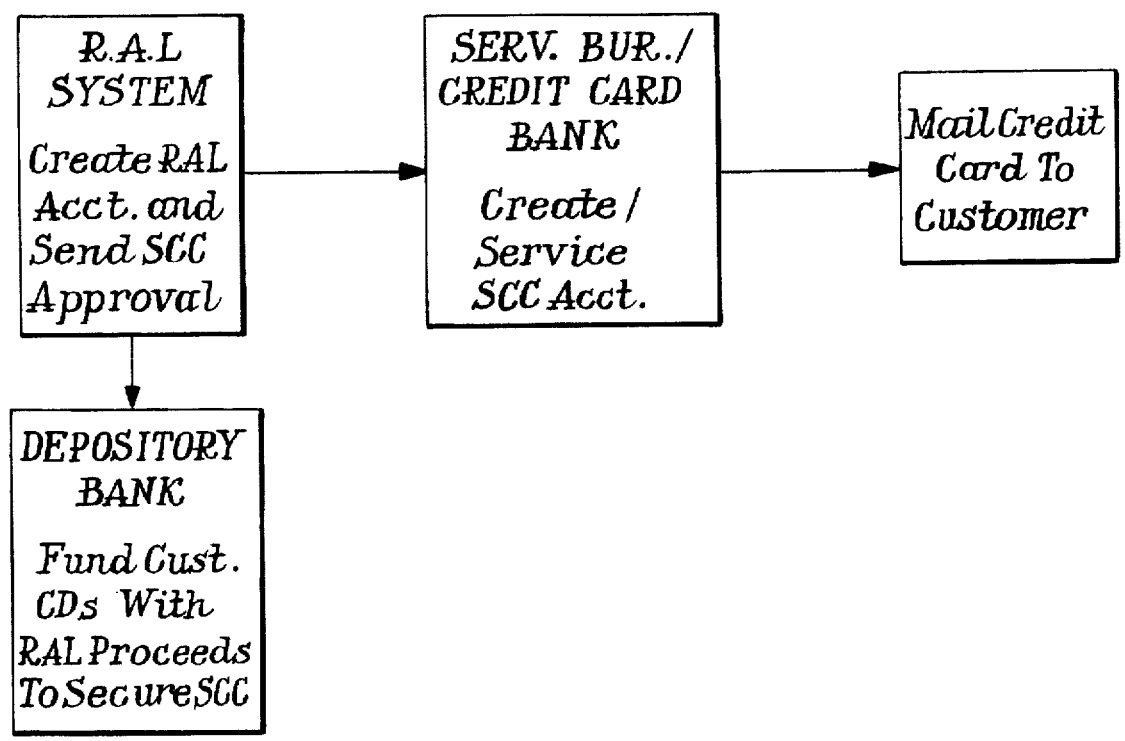
FIG. 2—is a schematic flow diagram of data processing functions of another embodiment of the invention.

Referring to FIG. 2, the RAL demand loan created in the deposit/loan account of the authorized financial institution is used to create an account used as collateral for a secured credit card. This secured credit card option may be selected by the taxpayer when completing a RAL application along with the amount of the credit line and corresponding collateral desired (usually anywhere from $500–$3000). Once the PAL application is approved a credit card can usually be mailed to the taxpayer within 48 hours by a credit card company.

This RAL secured credit card system is typically initialized at the office of the tax preparer which would obtain information common to the tax return, RAL loan and secured credit card such as name, address, social security number, etc. The data needed to process the tax return is then transmitted electronically to the Internal Revenue Service (IRS) or similar tax authority along with an indication of the deposit/loan account to which any refund should be paid. Typically the IRS will indicate whether the return has been accepted for filing and direct deposit of the refund in the designated deposit/loan account within 12–24 hours of receipt.

Upon receipt of this advice from the IRS further processing of the secured credit card is commenced. This includes electronic transmission to a service bureau, bank or other credit card issuer of information needed to create the secured credit card account and the credit line on that account. This information is then used to physically create and mail the credit card to the customer as represented in FIG. 2.

IRS approval of the tax refund also triggers creation of a Certificate of Deposit at a bank. That bank can be the same one that issued the credit card or it may be a separate bank as illustrated in FIG. 2. The Certificate of Deposit is typically established for a period such as eighteen months and for an amount corresponding to the credit limit on the secured credit card. This Certificate guarantees payment to the credit card issuer should the credit card user fail to pay off his charges when due and payable.

To the extent the tax refund exceeds the amount of the Certificate of Deposit, that excess is returned to the taxpayer in the manner described above. To accomplish these multiple goals in the present embodiment the financial institution programs a data processing means in accordance with the program flow chart of Microfiche Appendix III.

What is claimed is:

1. An electronic data processing system for preparing income tax returns, authorizing refund payments and obtaining a secured credit card comprising:

a) at least one electronic data processing means for executing programmed arithmetic and logical processes and storing data;

b) at least one data input means at a tax preparer site for inputing tax return data and credit card application data to said at least one data processing means;

c) means implemented by said at least one data processing means for processing tax return data and creating electronic tax return data files;

d) means implemented by said at least one data processing means for processing secured credit card application data and electronically creating a deposit and loan account file which is used to create a deposit and loan account and a collateral account file which is used to create a collateral account at a remote financial institution for receipt of tax refund payments which are used to fund the collateral for issuance of a credit card after which said deposit and loan account is automatically closed;

e) means implemented by said at least one data processing means for processing said tax return data files and said deposit and loan account file and for electronically transmitting electronic tax return data to at least one electronic data processing means controlled by at least one tax collecting authority and for authorizing receipt by said financial institution of an electronic funds transfer from said at least one electronic data processing means controlled by at least one tax collecting authority into said deposit and loan account; and f) means implemented by said at least one data processing means for electronically processing said tax return data files, said deposit and loan account file, and said collateral account file and authorizing transfer of funds from said deposit and loan account to said collateral account to establish collateral for the issuance of the secured credit card.

2. The electronic data processing system as claimed in claim 1, wherein said input means includes keyboard input means, visual monitor means, data storage means, data transmission means and programmable data processing means which implements said means for processing said tax return data and credit card application data and transmitting said tax return data and said secured credit card application data to a remote processing center.

3. The electronic data processing system as claimed in claim 2, wherein said remote processing center includes at least one programmable data processing means which implements said means for processing secured credit card application data and creating deposit and loan account files, for transmitting electronic tax return data to and for authorizing receipt of by said authorized financial institution electronic funds transfer data from said at least one electronic data processing means controlled by at least one tax collecting authority and for executing said means for processing said tax return data files and said deposit and loan account files and means for authorizing a secured credit card to be issued using as collateral funds from said collateral account.

4. The electronic data processing system as claimed in claim 1, wherein part of the funds in the deposit and loan account are used as the collateral for the secured credit card.

5. The electronic data processing system as claimed in claim 1, wherein all of the funds in the deposit and loan account are used as the collateral for the secured credit card.

6. The electronic data processing system as claimed in claim 1, wherein the collateral is a certificate of deposit.

7. The electronic data processing system as claimed in claim 6, wherein the certificate of deposit is for approximately eighteen months.

8. The electronic data processing system as claimed in claim 1, further including a means for charging the process fees of said credit card application to said credit card.

9. The electronic data processing system as claimed in claim 1, further including a means for charging the intended annual fees or process fees of said credit card application or both the intended annual fees and process fees of said card application to said credit card.

10. The electronic data processing system as claimed in claim 1, wherein said secured credit card is issued.

11. A method of operating at least one programmable electronic data processing machine comprising the programmed steps of:

a) receiving inputed tax return data, refund payment data, and credit card application data;

b) creating electronic tax return data files from said tax return data;

c) electronically creating deposit and loan account files used to create a deposit and loan account and collateral account files used to create a collateral account at a remote financial institution for receipt of tax refund payments which are used to fund the collateral for issuance of a credit card after which said deposit and loan account is automatically closed;

d) electronically transmitting said electronic tax return data files to at least one tax collecting authority including the identification of the deposit and loan account;

e) electronically processing said tax return data and said deposit and loan account files and authorizing payment by said authorized financial institution from said deposit and loan account of a tax refund amount based on said tax return data prior to completion of tax return processing by said tax collecting authority; and f) authorizing receipt by said authorized financial institution into said deposit and loan account files of a tax refund transfer, based on said tax return data, from said tax collecting authority.

12. A method of preparing income tax returns and issuing secured credit cards collateralized by a tax refund comprising the steps of:

a) inputting tax return data, refund payment data, and loan application data, into a programmable electronic data processing machine at a tax preparation location;

b) creating at least one electronic tax return data file from said tax return data;

c) electronically creating a deposit and loan account file which is used to create a deposit and loan account and a collateral account file which is used to create a collateral account at a remotely located financial institution for receipt of tax refund payments to be used as collateral for issuance of a credit card, after which said deposit and loan account is automatically closed;

d) electronically transmitting said tax return data file to at least one tax collecting authority;

e) electronically processing said tax return data file and said deposit and loan account file and authorizing payment of all or part of said tax refund by said authorized financial institution from the deposit and loan account into said collateral account of an amount based on said tax return data to be used as collateral for a secured credit card;

f) authorizing receipt by said financial institution into the deposit and loan account of a tax refund amount transfer from the tax collecting authority, based on the tax return data.

13. The method as claimed in claim 12, wherein only a part of the tax refund amount transferred to the deposit and loan account from the tax collecting authority is used as collateral for the secured credit card.

14. The method as claimed in claim 13, wherein another portion of the tax refund amount is paid to the taxpayer or used to underwrite a loan to the taxpayer.

15. A method of operating at least one programmable electronic data processing machine comprising the programmed steps of:

a) receiving inputed tax return data, refund payment data, and credit card application data;

b) creating electronic tax return data files from said tax return data;

c) electronically creating
   (i) credit card application files for a secured credit card account related to said tax return data and said refund payment data at an authorized financial institution; and
   (ii) deposit and loan account files used to create a deposit and loan account and collateral account files used to create a collateral account at a remote financial institution for receipt of tax refund payments which are used to fund the collateral for issuance of a credit card after which said deposit and loan account is automatically closed;

d) electronically transmitting said electronic tax return data files to at least one tax collecting authority including the identification of the deposit and loan account;

e)
   i) electronically processing said tax return data and said deposit and loan account files and authorizing payment by said authorized financial institution from said deposit and loan account of a tax refund amount based on said tax return data prior to completion of tax return processing by said tax collecting authority; or
   ii) electronically processing said tax return data and said credit card application files and authorizing payment by said authorized financial institution from said deposit and loan account of an amount used as collateral for said credit card based on said tax return data prior to completion of tax return processing from said tax collecting authority; and f) authorizing receipt by said authorized financial institution into said deposit and loan account files of a tax refund transfer, based on said tax return data, from said tax collecting authority.

* * * * *